(12) United States Patent
Gillio

(10) Patent No.: US 8,820,984 B2
(45) Date of Patent: Sep. 2, 2014

(54) PROGRAMMABLE LIGHTING EFFECT DEVICE AND SYSTEM

(76) Inventor: Lee Gillio, Lake Alfred, FL (US)

( * ) Notice: Subject to any disclaimer, the term of this patent is extended or adjusted under 35 U.S.C. 154(b) by 237 days.

(21) Appl. No.: 13/282,140

(22) Filed: Oct. 26, 2011

(65) Prior Publication Data

US 2013/0106283 A1     May 2, 2013

(51) Int. Cl.
*F21V 1/06*     (2006.01)
*F21V 15/00*    (2006.01)
*H05B 37/02*    (2006.01)

(52) U.S. Cl.
CPC .............. *H05B 37/029* (2013.01); *Y02B 20/19* (2013.01)
USPC ............................ 362/372; 362/377; 362/378

(58) Field of Classification Search
USPC ............... 315/291, 307, 312, 32, 35, 33, 294, 315/295; 362/372, 377, 378, 383, 184
See application file for complete search history.

(56) References Cited

U.S. PATENT DOCUMENTS

| | | | |
|---|---|---|---|
| 5,796,376 A | 8/1998 | Banks | |
| 6,329,767 B1 * | 12/2001 | Sievers | 315/307 |
| 7,352,138 B2 * | 4/2008 | Lys et al. | 315/291 |
| 7,484,860 B2 * | 2/2009 | Demarest et al. | 362/253 |
| 7,956,546 B2 * | 6/2011 | Hasnain | 315/200 R |
| 2005/0135107 A1 * | 6/2005 | Currie et al. | 362/382 |
| 2007/0014549 A1 * | 1/2007 | Demarest et al. | 392/393 |
| 2009/0273940 A1 * | 11/2009 | Thurgood et al. | 362/373 |
| 2010/0187964 A1 * | 7/2010 | Thurgood et al. | 313/46 |
| 2011/0153072 A1 * | 6/2011 | Anderson | 700/245 |

* cited by examiner

*Primary Examiner* — Minh D A
(74) *Attorney, Agent, or Firm* — Jason T. Daniel, Esq.; Daniel Law Offices, P.A.

(57) ABSTRACT

A programmable lighting effect device and system includes a main body having a plug secured to the first end, a socket secured to the second end, and a controller secured within a middle portion. The controller utilizes the alternating current frequency of the supplied electricity as a common clock and further instructs a light bulb installed within the socket to perform a predetermined illumination effect based on stored operating instructions.

17 Claims, 7 Drawing Sheets

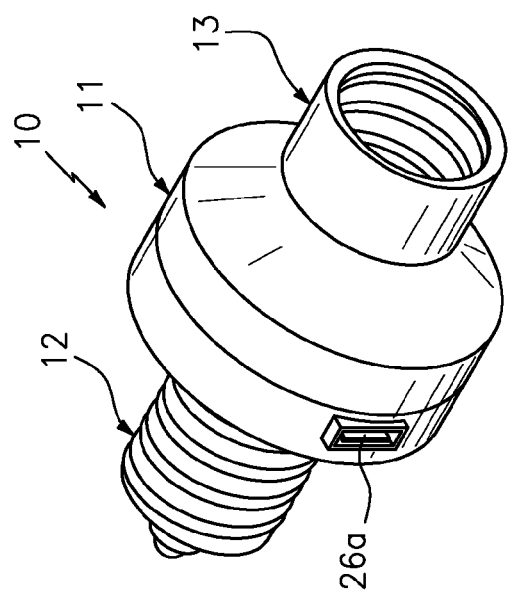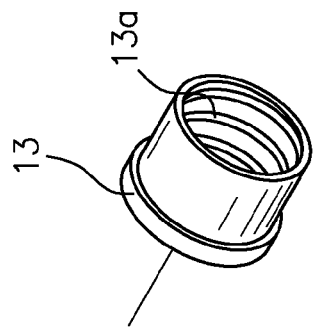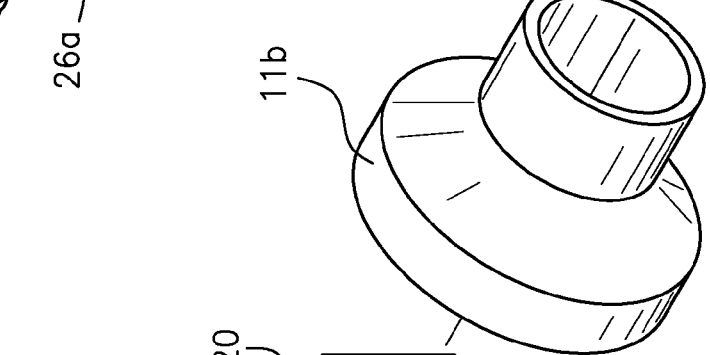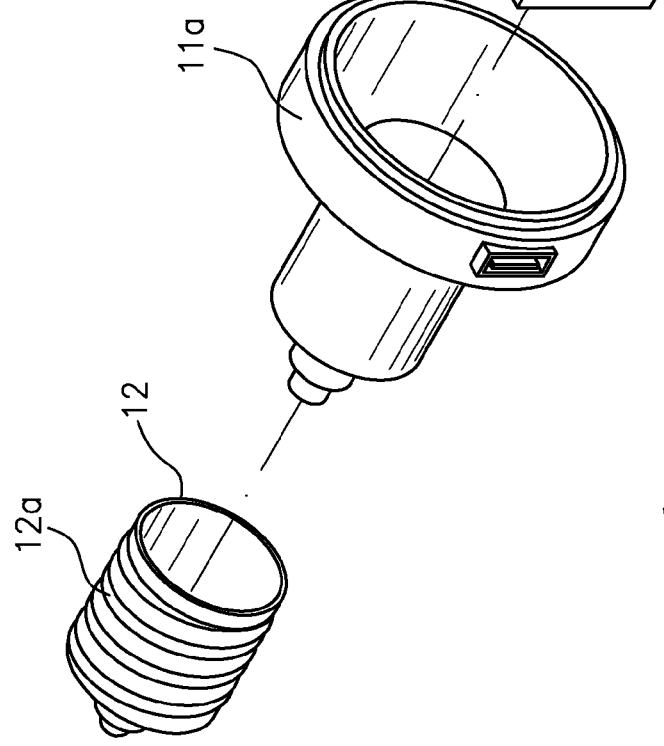

PROGRAMMABLE LIGHTING EFFECT DEVICE AND SYSTEM

BACKGROUND

Field of the Invention

The present invention relates generally to lighting control devices, and more particularly to a programmable lighting effect and control device capable of utilizing the alternating current frequency of a power source as a clock for synchronizing and creating various lighting effects.

Many businesses across the globe use illuminated strands of lights and/or lighted signs to display goods and to attract the attention of potential customers. One common device employed by restaurants, movie theatres, casinos and other such establishments utilize marquee signs having multiple lights acting in unison to form visual effects.

A typical example of such a sign is illustrated in FIG. 1. As shown, the marquee sign 1 utilizes multiple incandescent bulbs operating as a four-channel (i.e. circuit) chase to give the illusion of motion. In order to create this visual effect, four discrete electrical circuits are used. As shown, every fourth bulb socket is wired to a common circuit, so that sockets $S^{1, 5, 9, 13}$, etc., are on the first circuit, sockets $S^{2, 6, 10, 14}$, etc., are on the second circuit, sockets $S^{3, 7, 11, 15}$, etc., are on the third circuit, and sockets $S^{4, 8, 12, 16}$, etc., are on the fourth circuit.

To this end, each circuit must then be routed back to a central controller 2, which provides the timing and sequence switching required to produce the desired effect. For more complex effects, the number of channels increases, requiring separate electrical circuits for each channel. Complex effects also require controllers capable of handling the required number of channels. These controllers are often custom-built at great expense, and repair or replacement is often impractical or impossible. As a result, traditional animated signs are extremely expensive, difficult to maintain, and labor-intensive to produce. Moreover, as each channel controls many different bulbs, failure of any one channel results in a substantial loss of functionality to the entire system.

Accordingly, there remains a need for a device and system capable of controlling individual lighting instruments while working in unison to create various lighting effects without the drawbacks described above.

SUMMARY OF THE INVENTION

The present invention is directed to a programmable lighting effect device and system. One embodiment of the present invention can include a main body having a plug secured to the first end, a socket secured to the second end, and a controller secured within a middle portion. The controller being configured to cause a light bulb installed within the socket to perform a predetermined illumination effect.

Another embodiment of the present invention can include a clock signal converter configured to convert the alternating current frequency of the supplied electricity into a clock for use by the controller.

Another embodiment of the present invention can include a system having a plurality of programmable lighting effect devices connected to a common power source and configured to perform a synchronized lighting effect.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 2a is a perspective view of a programmable lighting effect device that is useful for understanding the inventive concepts disclosed herein.

FIG. 2b is an exploded parts view of the programmable lighting effect device according to one embodiment of the invention.

DETAILED DESCRIPTION OF THE INVENTION

Figure 1:
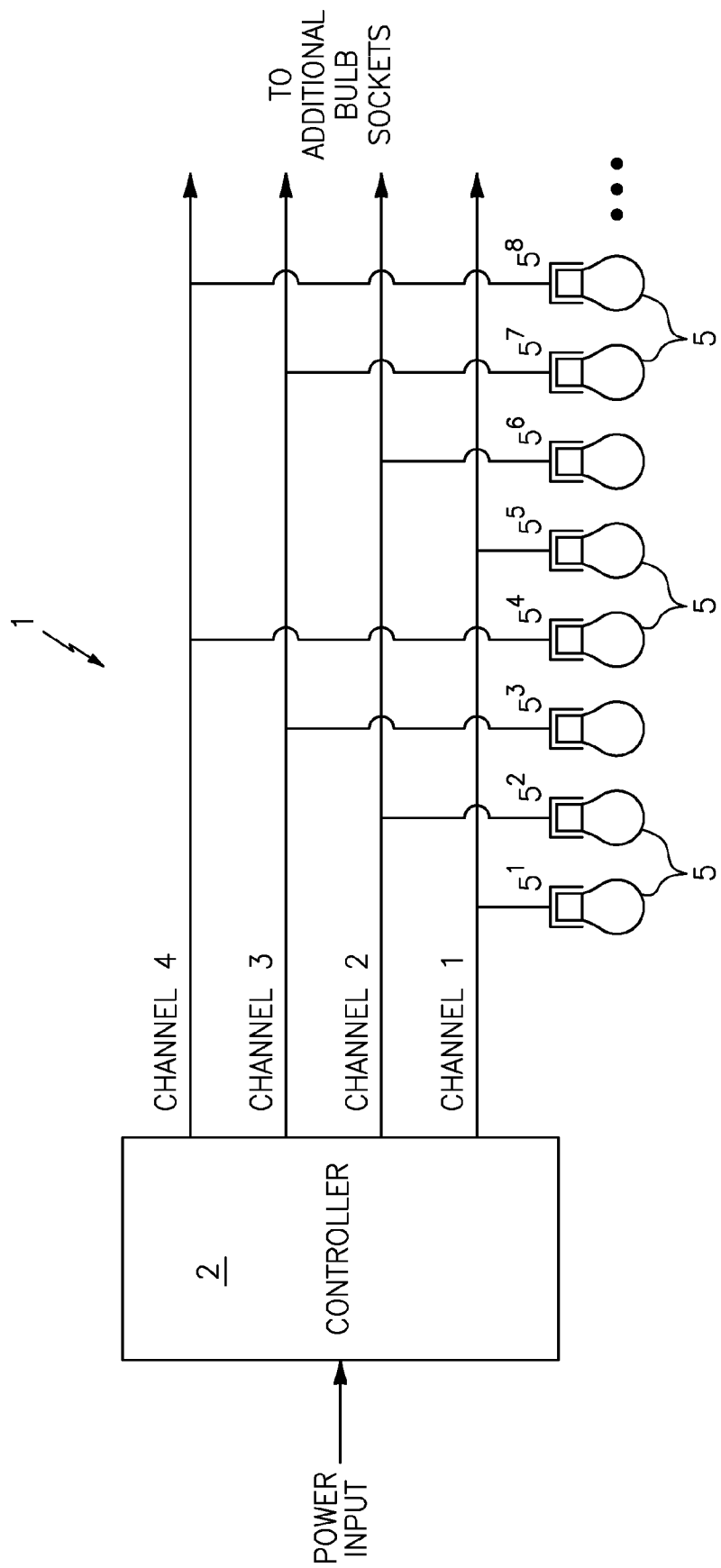
FIG. 1 is an illustration of a marquee sign in accordance with background art.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Additionally, commonly known articles such as connecting wires, mounting clips and the like may be omitted from the drawings for the sake of clarity. Further, the terms and phrases used herein are not intended to be limiting but rather to provide an understandable description of the invention.

As described herein, computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Programming can also be accomplished in the processor's native machine language. For purposes of this description, the terms "upper," "bottom," "right," "left," "front," "vertical," "horizontal," and derivatives thereof shall relate to the invention as oriented in FIG. 2a.

FIGS. 2a and 2b illustrate one embodiment of a programmable lighting effect device 10 that is useful for understanding the inventive concepts disclosed herein. As shown, the device can include a main body/shell 11 having a plug 12 at one end and a light bulb socket 13 at the other end. Positioned within the main body can include a controller 20 for coordinating the functions of the device.

The main body 11 can act to securely position the controller 20, the plug 12 and the socket 13 in a conventional manner, so as to create a single integrated device. To this end, the body itself can take any number of distinct shapes, and can be constructed from any number of known materials and methods. In one preferred embodiment, body 11 can be constructed from two removably connected opposing plastic halves 11a and 11b each having a hollow interior space forming a cavernous interior into which the controller 20 can be located. Of course, other embodiments in which the main body is of unitary construction and other known construction materials are also contemplated.

The plug 12 can act as a power input unit capable of connecting the device to a conventional A/C power source and to conduct the electrical energy into the controller 20 via one or more cables (not shown). In one embodiment, the connector 12 can include a metallic sleeve having a plurality of threads 12a configured to be screwed into a conventional incandescent light bulb socket. Such a feature can allow the device 10 to be serially connected along a string of conventional lights as will be described below.

Although described above as for use with an incandescent light socket, this is for illustrative purposes only, as the plug 12 can take any number of distinct shapes and sizes in order to be secured to other types of light bulb fixtures. Moreover, the plug 12 can include any number of known devices capable of receiving electrical power, such as a conventional plug or metallic terminals, for example.

The socket 13 can act to receive a light bulb and provide power to the same in a conventional manner. Accordingly, the socket 13, according to one embodiment can include a plurality of internal threads 13a configured to allow an incandescent light bulb to be connected to the device.

Although described above as utilizing an incandescent bulb and socket, this is for illustrative purposes only, as one of skill in the art will recognize that virtually any type of lighting instrument such as LED, neon, fluorescent, and the like, along with the accompanying socket, can be utilized herein.

Figure 3A:
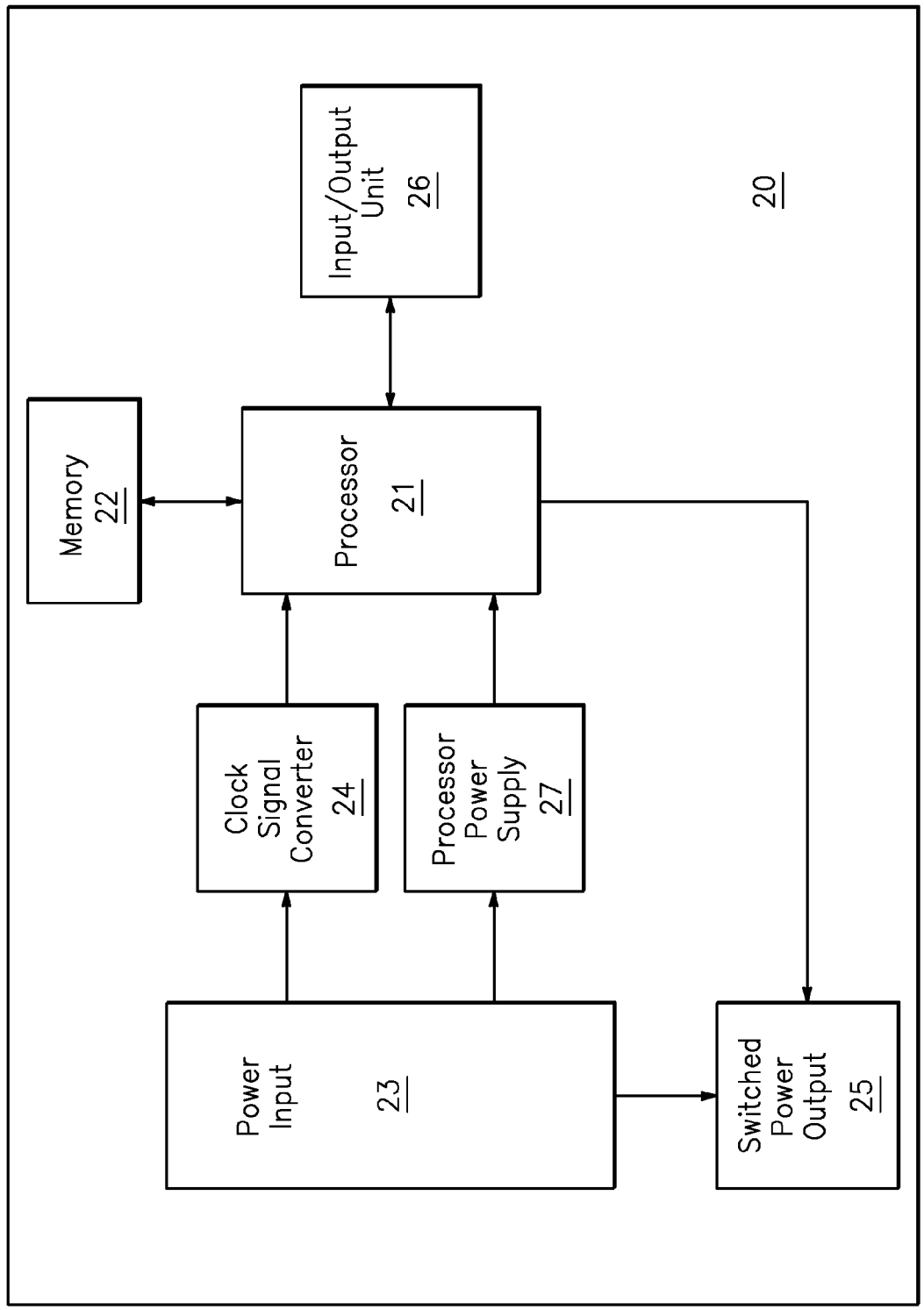
FIG. 3a is a schematic block diagram of a controller according to one embodiment of the invention.

FIG. 3a illustrates a block diagram of a controller for regulating the operation of the device, in accordance with one embodiment of the invention. As shown, the controller 20 can include a processor 21 that is conventionally connected to an internal memory 22, a power input unit 23, a clock signal converter 24, a power output unit 25 an input/output unit 26 and a processor power supply unit 27.

The processor 21 can act to execute program code stored in the memory 22 in order to allow the device to perform the functionality described herein. One non-limiting example of a suitable processor for the device includes PIC12F629/675 commercially available by Microchip® brand products. Of course many other known processors can also be utilized herein. As the design and functionality of processors are extremely well known in the art, no further description will be provided.

Memory 22 can act to store operating instructions in the form of program code for the processor 21 to execute. These operating instructions can be pre-programmed into the memory at the time of installation or can be introduced at a later time via the input/output unit 26. Although illustrated in FIG. 3a as a single component, memory 22 can include one or more physical memory devices such as, for example, local memory and/or one or more bulk storage devices. As used herein, local memory can refer to random access memory or other memory device(s) generally used during actual execution of program code, whereas a bulk storage device can be implemented as a persistent data storage device. Additionally, memory 22 can also include one or more cache memories that provide temporary storage of at least some program code in order to reduce the number of times program code must be retrieved from a bulk storage device during execution. Each of these devices are well known in the art.

Figure 3B:
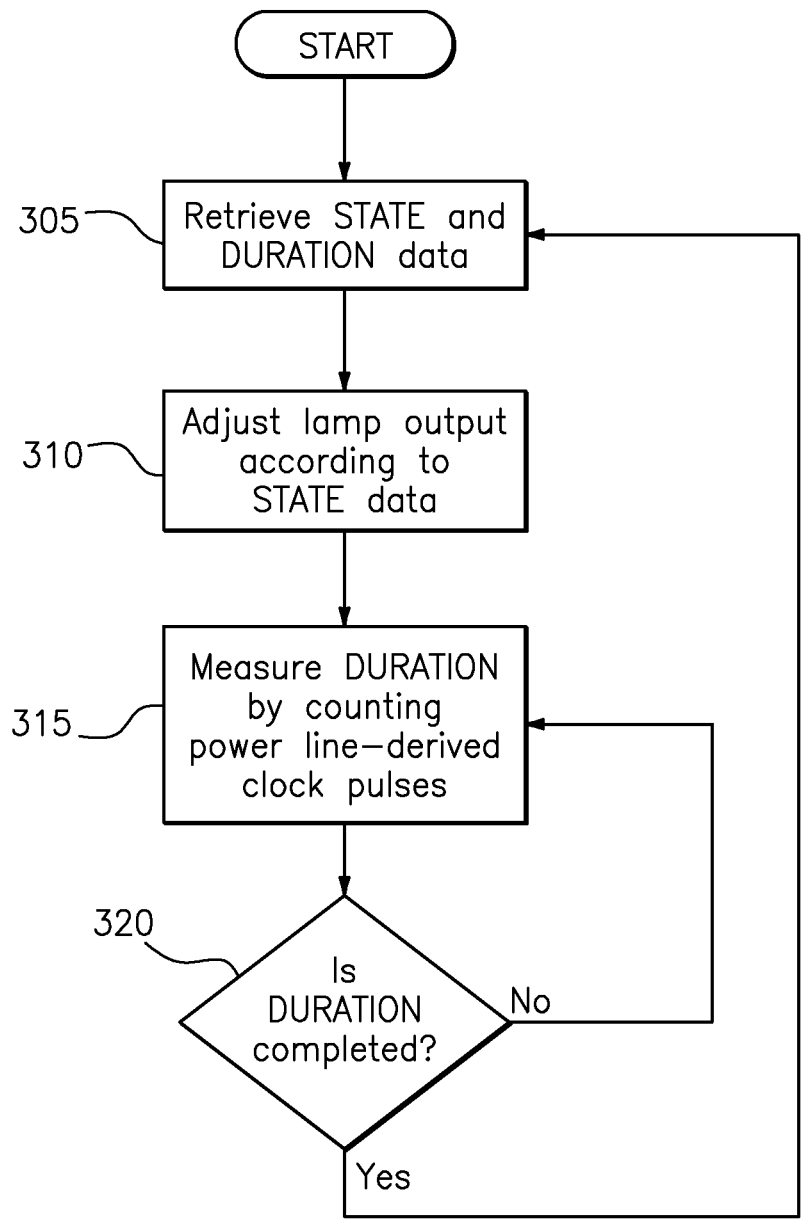
FIG. 3b is a block diagram illustrating a method in accordance with the inventive concepts disclosed herein.

FIG. 3b illustrates an exemplary method 300 for understanding the functionality of the device. As such, method 300 can begin at step 305 where the processor 21 can retrieve the lighting effect playback data (state and duration data) from any means including, but not limited to programmed loops, nested loops, lookup tables and algorithm-derived data.

Once the data has been retrieved, the method can proceed to step 310 where the device can adjust the output of the socket according to the state data, and then move to step 315 where the duration can be measured by counting power line-derived clock pulses.

Next, the method will proceed to step 320 where a determination as to the completion of the duration will be made. If the duration is complete, the method will return to step 305. If the duration is not complete, the method will return to step 315.

Returning to FIG. 3a, the power input unit 23 can act to receive the A/C electrical power from the plug 12 and convert the same to a suitable voltage for operating other elements of the device.

The processor power supply unit 27 can act to provide power for the processor and/or memory elements. In one embodiment, the processor power supply unit 27 can include a conventional step down transformer and rectifier circuit capable of outputting an appropriate DC voltage. Of course any number of other known devices capable of producing the required voltage can also be utilized herein.

The clock signal converter 24 can act to utilize the alternating current frequency (typically 50-60 Hz) of a conventional alternating current power source as a clock signal for the device, and transmit the same to the processor. As will be described below in detail, when a plurality of lighting effect devices 10 are connected to the same power source, each device can operate independently while also being synchronized to a common clock signal.

In one embodiment, the clock signal converter 24 can include a resistor and diode conventionally connected to the output of the step down transformer (preferably before entering the rectifier) in order to protect the processor. Of course any number of other devices capable of sensing the current frequency of a power source and relaying the same to the processor as a clock signal can also be utilized.

Although described above as utilizing the main power line frequency for synchronization, the invention is not so limited. For example in an alternate embodiment (not illustrated) the device may utilize conditioned power waveforms from a main controller. These waveforms may include, but are not limited to, variable-frequency alternating current, variable-frequency pulsed direct current, or any other form of power containing a detectable periodic signal which can be used for synchronization.

The power output unit 25 can act to transmit the received A/C power (or DC if utilizing a DC powered bulb) directly to the socket 13 when instructed by the processor. To this end, the power output unit can include a conventional electrical switch or other known device that is interposed between the socket 13 and plug 12. In one embodiment, the processor 21 can instruct the power output unit to activate or terminate the power flowing to the socket based on the supplied program code.

The input/output unit 26 can act to accept user inputs and/or programming code for the processor to execute. To this end, the input/output unit can include any number of conventional devices capable of receiving program instructions for the processor to execute, such as an in-circuit serial programming port, for example. In one preferred embodiment, the input/output unit 26 can include a conventional USB serial port and connector 26a for communicating with an external device. In one alternate embodiment, the input/output unit can include one or more push buttons (not illustrated) that are connected to the processor 21 so as to activate different programmatic functions. For example, pushing the button once could activate a first program and pushing the button twice could activate a second program. Further, some embodiments of the present invention may be further configured to receive instructions directly through the provided electricity (e.g., power line communication).

Although described above as utilizing fixed components for receiving program instructions, alternate embodiments of the invention include the ability to receive wireless instructions in a conventional manner. To this end, wireless instructions may be in the form of infrared, Bluetooth, cellular, and other known mediums.

In accordance with one preferred embodiment, the operating instructions stored in the memory 22 can instruct the processor to activate the power output unit 25 at a specified time and for a specified duration, thereby causing an installed light bulb 5 to perform an illumination effect (such as blinking, for example). As described above, the clock signal converter 24 can act to translate the alternating current frequency of the power source into a clock signal for use by the processor. To this end, when multiple devices 10 are arranged across a common power source, it becomes possible to coordinate the illumination effects of each device by utilizing the installed operating instructions and the common clock.

For example, a simple chase pattern can be achieved by connecting a series of devices 10 in a straight line across a common power source (see FIG. 6 below). Prior to installation, each of the devices can include operating instructions to blink at a specified time T. In order to achieve a chase pattern, the T for each device can be incrementally delayed in order to illuminate each device in order, thus creating the appearance of a chase pattern. To this end, one of skill in the art will readily understand that the inventive concepts disclosed herein can act to create any number of unique lighting effects, such as timed blinking, chasing, spelling, scintillating, fading, and many others.

Moreover, owing to the fact that each device 10 is independently controlled, the failure of one device will not adversely affect the operation of the remaining devices. To this end, each device can be reset by simply cycling the power to the device.

Figure 4:
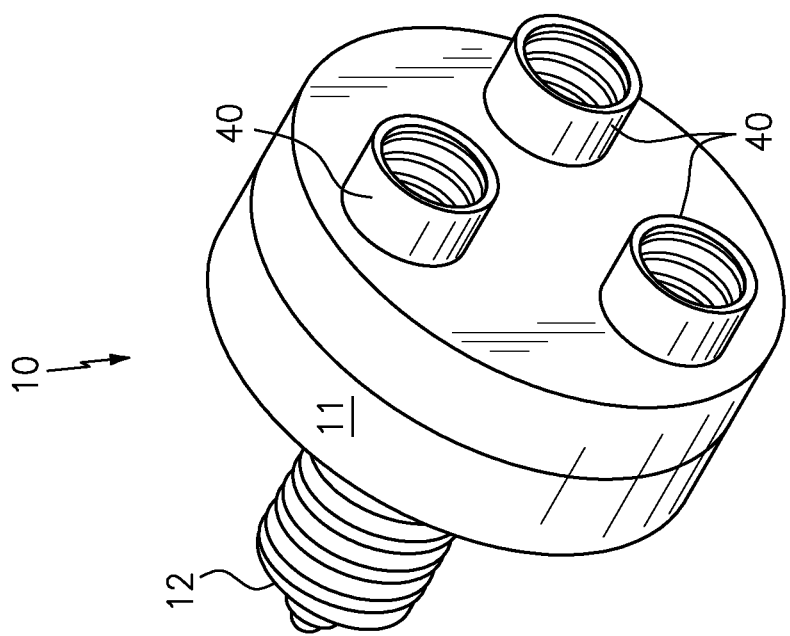
FIG. 4 is a perspective view of a programmable lighting effect device in accordance with an alternate embodiment of the invention.

FIG. 4 illustrates an alternate embodiment of a programmable lighting effect device that further includes a plurality of sockets 40, each configured to house a lighting instrument. In one embodiment, each of the sockets 40 can be configured to house identical lighting instruments (such as incandescent, for example). In an alternate embodiment, each of the sockets 40 can be configured to house different lighting instruments (e.g., LED and CFL). As described herein, each socket 40 can be virtually identical to socket 13 described above, and can be secured to the main body 11 so as to allow multiple lighting instruments to be independently controlled by the device.

Figure 5:
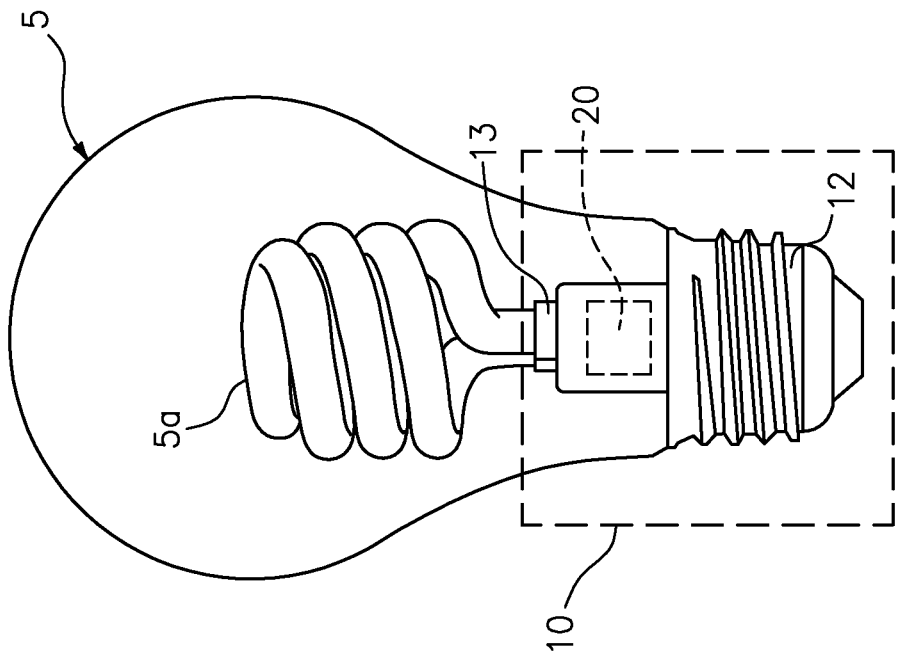
FIG. 5 is a perspective view of a programmable lighting effect device in accordance with an alternate embodiment of the invention.

FIG. 5 illustrates another alternate embodiment of a programmable lighting effect device 10 that is integrated into the construction of a lighting instrument. As illustrated, the lighting instrument 5a of the light bulb 5 can be connected directly to the socket 13, and the plug 12 of the device can function as the plug for the light bulb. Of course, this is but one embodiment illustrating how the device 10 can be incorporated into the bulb itself, as one of skill in the art will recognize that any number of alternative layouts are also contemplated.

Figure 6:
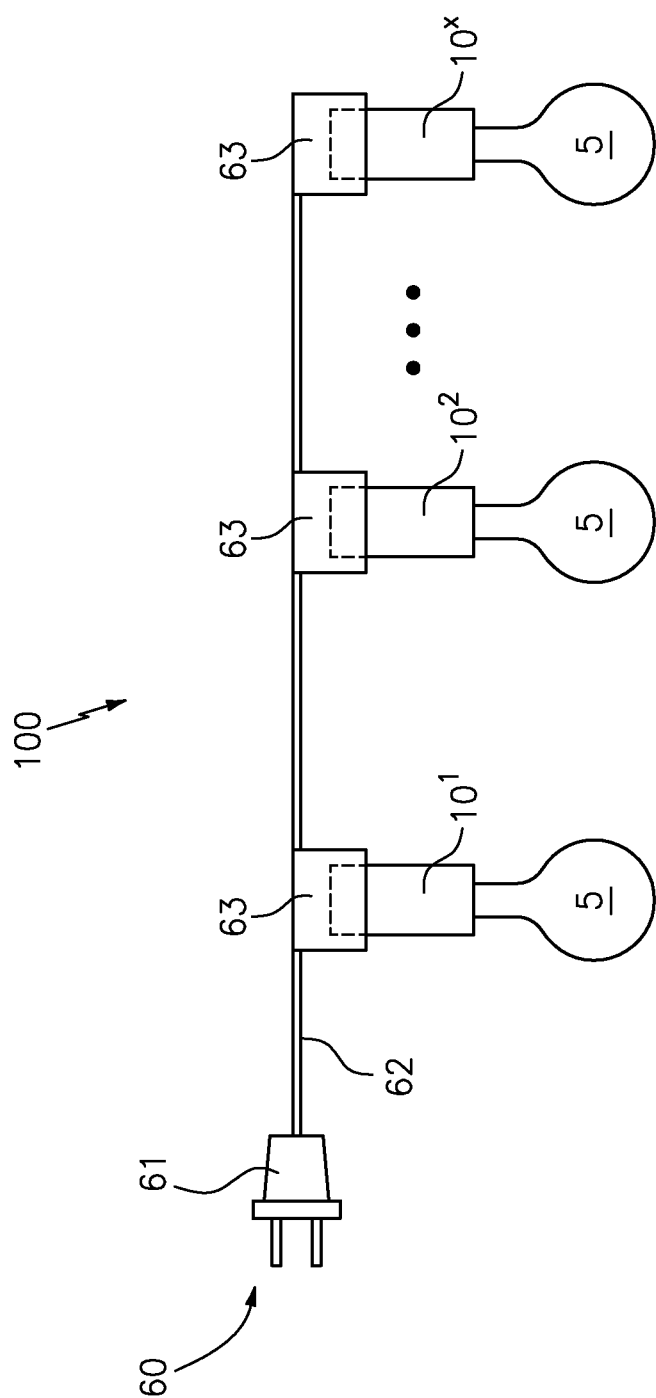
FIG. 6 illustrates one embodiment of a programmable lighting effect system in accordance with one embodiment of the invention.

FIG. 6 illustrates one embodiment of a synchronized lighting effect system 100 that includes a plurality of programmable lighting devices $10^1$, $10^2$ ... $10^x$, each having an installed bulb 5, that are connected to a light string 60. As shown, light string 60 can include a conventional power plug 61 connected to an elongated cord 62 supplying power to a plurality of sockets 63. In this embodiment, each of the lighting devices 10 can be conventionally connected to one of the sockets 63. Accordingly, when the light string is plugged in to a conventional A/C power source, the processor contained within each of the lighting devices $10^1$, $10^2$ ... $10^x$ will begin performing an illumination effect according to the operating instructions contained within the internal memory.

Figure 7:
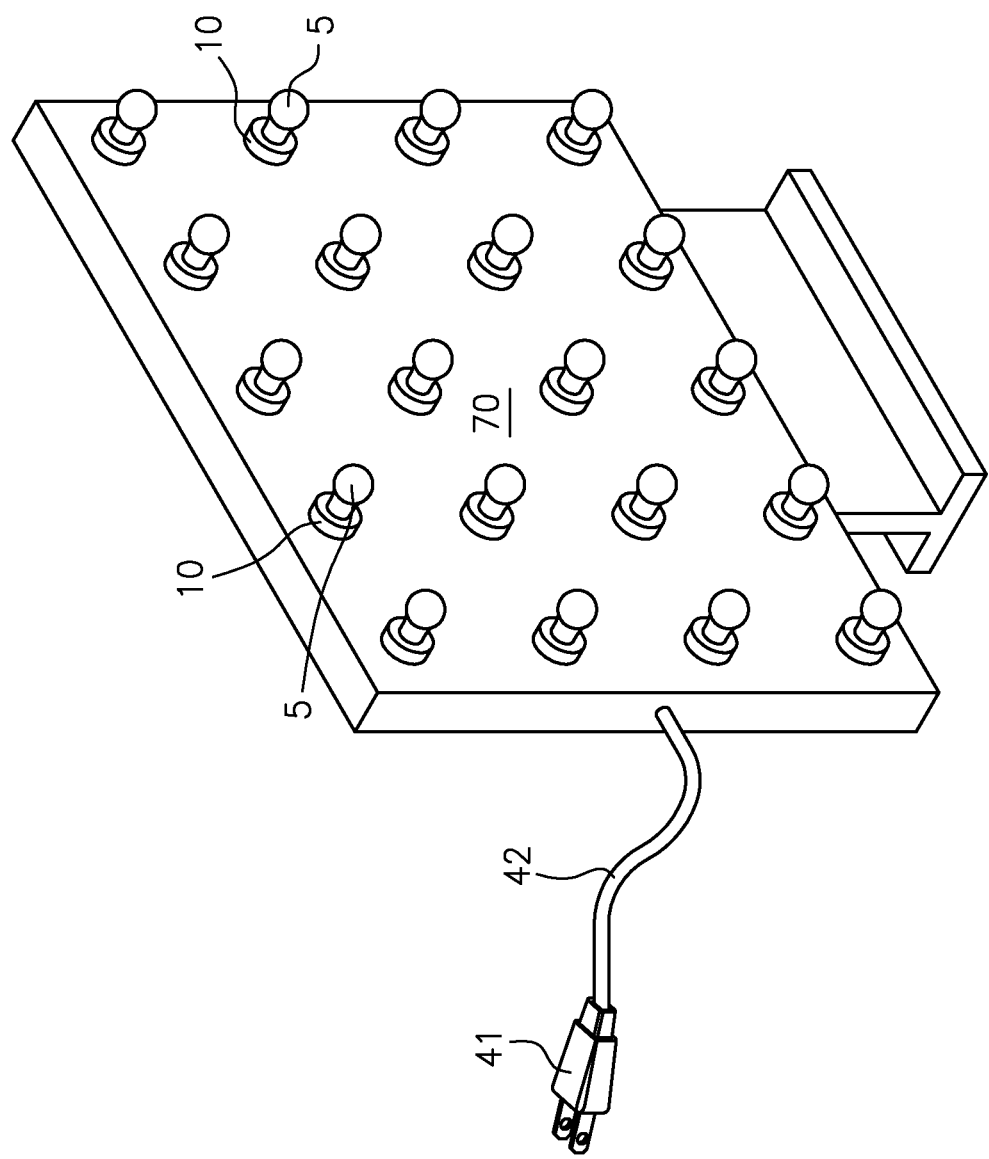
FIG. 7 illustrates one embodiment of a programmable lighting effect system in accordance with another embodiment of the invention.

Although described as including a light string 60, one of skill in the art will recognize that a plurality of devices 10 can be installed into an existing light string in order to achieve the inventive concepts disclosed herein. Moreover, as further illustrated in FIG. 7, one or more of the programmable lighting effect devices can be also be utilized to transform a conventional non-animated sign 70 into a dynamic sign capable of displaying a plurality of lighting effects.

As described above, the device 10 can take any number of distinct shapes and sizes. In one alternate embodiment, the device 10 can take the shape of a button that is interposed between a socket and a light bulb. This concept is described in U.S. Pat. No. 5,030,890 and U.S. Pat. No. 3,818,263, the contents of each of which are incorporated herein by reference.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A programmable lighting effect device, comprising:
   a main body having a first end, a second end and a cavernous interior;
   a plug secured to the first end of the main body, said plug being configured to receive electrical power having an alternating current frequency;
   a socket secured to the second end of the main body, said socket being configured to accept a lighting instrument and provide electrical power to the same; and
   a controller secured within the cavernous interior of the main body and in communication with each of the plug and socket, said controller including
      a clock signal converter functioning to translate the alternating current frequency received by the plug into a common clock signal, and
      a processor that is configured to cause a lighting instrument installed within the socket to perform a predetermined illumination effect utilizing the clock signal.

2. The programmable lighting effect device of claim 1, further comprising:
   a plurality of sockets secured to the second end of the main body, each of said sockets being configured to accept a lighting instrument and provide electrical power to the same based on the clock signal.

3. The programmable lighting effect device of claim 2, wherein each of the plurality of sockets are configured to accept an identical lighting instrument.

4. The programmable lighting effect device of claim 2, wherein at least one of the plurality of sockets are configured to accept a lighting instrument that is different from the other sockets.

5. The programmable lighting effect device of claim 1, wherein said controller further includes:
   a memory configured to receive and store operating instructions for execution by the processor,
   at least one power input unit configured to receive the electrical power from the socket and convert the same to a desired voltage,
   a power output unit configured to supply the electrical power to the socket, and
   an input/output unit configured to communicate operating instructions from an outside device to the processor.

6. The programmable lighting effect device of claim 5, wherein said memory includes a random access memory device.

7. The programmable lighting effect device of claim 5, wherein said memory includes a persistent memory device.

8. The programmable lighting effect device of claim 5, wherein said input/output device includes a USB serial port device.

9. The programmable lighting effect device of claim 5, wherein said input/output device includes one or more push button devices.

10. The programmable lighting effect device of claim 5, wherein said power input unit includes a step down transformer and a rectifier circuit.

11. The programmable lighting effect device of claim 5, wherein said clock signal converter includes a resistor and a diode.

12. The programmable lighting effect device of claim 1, wherein said plug includes a plurality of metallic sleeves configured to attach to a conventional incandescent light bulb fixture, and said socket includes plurality of internal threads configured to receive a conventional incandescent light bulb.

13. The programmable lighting effect device of claim 1, wherein said plug includes one or more connectors configured to attach to at least one of an LED, neon and fluorescent lighting fixture.

14. The programmable lighting effect device of claim 1, wherein said socket includes one or more connectors configured to receive at least one of an LED, neon and fluorescent light bulb.

15. A programmable lighting effect system, comprising:
   a power supply cord configured to convey electrical power having an alternating current frequency; and
   a plurality of programmable lighting effect devices, that are in communication with the power supply cord, each of said devices including
      a main body having a first end, a second end and a cavernous interior,
      a plug secured to the first end of the main body, said plug being configured to receive the electrical power from the power supply cord,
      a socket secured to the second end of the main body, said socket being configured to accept a lighting instrument and provide the received electrical power to the same, and
      a controller secured within the cavernous interior of the main body and in communication with each of the plug and socket, said controller including
         a clock signal converter functioning to translate the alternating current frequency received by the plug into a common clock signal, and
         a processor that is configured to cause a lighting instrument installed within the socket to perform a predetermined illumination effect utilizing the common clock signal,
   wherein the predetermined illumination effect of each of the plurality of programmable lighting effect devices is synchronized with the common clock signal.

16. A programmable lighting effect device, comprising:
   a light bulb that includes a main body having a first end and a cavernous interior;
   a plug secured to the first end of the main body, said plug being configured to receive electrical power having an alternating current frequency;
   a lighting instrument positioned within the main body; and
   a controller secured within the cavernous interior of the main body and in communication with each of the plug and lighting instrument, said controller including
      a clock signal converter functioning to translate the alternating current frequency received by the plug into a common clock signal, and
      a processor that is configured to cause the lighting instrument to perform a predetermined illumination effect utilizing the clock signal.

17. The programmable lighting effect device of claim 16, wherein said controller further includes:
   a memory configured to receive and store operating instructions for execution by the processor,
   at least one power input unit configured to receive the electrical power from the plug and convert the same to a desired voltage,
   a power output unit configured to supply the electrical power to the lighting instrument, and
   an input/output unit configured to communicate operating instructions from an outside device to the processor.

* * * * *